(12) United States Patent
Kemmochi et al.

(10) Patent No.: US 7,471,962 B2
(45) Date of Patent: Dec. 30, 2008

(54) HIGH-FREQUENCY SWITCH CIRCUIT, HIGH-FREQUENCY SWITCH MODULE AND WIRELESS COMMUNICATIONS DEVICE COMPRISING IT

(75) Inventors: Shigeru Kemmochi, Saitama-ken (JP); Mitsuhiro Watanabe, Tottori-ken (JP); Tsuyoshi Taketa, Tottori-ken (JP); Hiroyuki Tai, Tottori-ken (JP)

(73) Assignee: Hitachi Metals, Ltd., Toyko (JP)

( * ) Notice: Subject to any disclaimer, the term of this patent is extended or adjusted under 35 U.S.C. 154(b) by 657 days.

(21) Appl. No.: 11/242,926

(22) Filed: Oct. 5, 2005

(65) Prior Publication Data

US 2006/0030355 A1   Feb. 9, 2006

Related U.S. Application Data

(62) Division of application No. 09/914,448, filed as application No. PCT/JP00/09435 on Dec. 28, 2000, now Pat. No. 7,003,312.

(30) Foreign Application Priority Data

Dec. 28, 1999   (JP) ................. 11-372747

(51) Int. Cl.
*H04M 1/00* (2006.01)
*H01P 1/10* (2006.01)
*H01P 5/12* (2006.01)

(52) U.S. Cl. ........... 455/552.1; 455/78; 333/103
(58) Field of Classification Search ........... 455/552.1, 455/78; 333/103
See application file for complete search history.

(56) References Cited

U.S. PATENT DOCUMENTS 5,699,023 A * 12/1997 Tanaka et al. ........... 333/103
5,786,738 A   7/1998 Ikata et al.
5,835,990 A   11/1998 Saw et al.
5,915,212 A   6/1999 Przelomiec et al.
6,011,450 A   1/2000 Miya
6,070,059 A   5/2000 Kato et al.

FOREIGN PATENT DOCUMENTS

| DE | 198 53 484 A1 | 5/1999 |
| EP | 0 744 831 A2 | 11/1996 |
| EP | 0 747 988 A1 | 12/1996 |
| EP | 0 921 642 A2 | 6/1999 |
| EP | 0 964 477 A1 | 12/1999 |

(Continued)

OTHER PUBLICATIONS

Machui, J., et al. "SAW Devices in Cellular and Cordless Phones," 1995 IEEE Ultrasonics Symposium (Nov. 7-10, 1995) (pp. 121-130).

(Continued)

*Primary Examiner*—Thjuan K Addy
(74) *Attorney, Agent, or Firm*—Finnegan Henderson Farabow Garrett & Dunner LLP

(57) ABSTRACT

A high-frequency switch circuit common to a plurality of frequency bands includes a first high-frequency switch adapted to pass transmission signals and block received signals; and a demultiplexer. The high-frequency switch circuit passes one of the received signals of first and second frequency bands and blocks the other.

10 Claims, 10 Drawing Sheets

FOREIGN PATENT DOCUMENTS

| | | |
|---|---|---|
| EP | 1 014 592 A2 | 6/2000 |
| GB | 2 333 669 A | 7/1999 |
| GB | 233669 A | 7/1999 |
| JP | 8-321738 | 12/1996 |
| JP | 821738 | 12/1996 |
| JP | 10-145270 A | 5/1998 |
| JP | 11-154804 | 6/1999 |
| JP | 2983016 | 8/1999 |
| JP | 11-313003 A | 11/1999 |
| JP | 2000-188522 | 7/2000 |

OTHER PUBLICATIONS

Supplementary European Search Report (EP 00 98 6004), Mar. 12, 2007.

* cited by examiner

HIGH-FREQUENCY SWITCH CIRCUIT, HIGH-FREQUENCY SWITCH MODULE AND WIRELESS COMMUNICATIONS DEVICE COMPRISING IT

This is a division of application Ser. No. 09/914,448, filed Aug. 28, 2001 now U.S. Pat. No. 7,003,312 and allowed on Jun. 24, 2005, which was the National Stage of International Application No. PCT/JP00/09435 filed Dec. 28, 2000 under 35 U.S.C. § 371, which claims the benefit of Japanese Application No. 11-372747, filed Dec. 28, 1999, which are incorporated herein by reference.

FIELD OF THE INVENTION

The present invention relates to a branching circuit used in high-frequency bands such as microwave bands, particularly to a branching circuit for branching high-frequency signals of a plurality of frequency bands, and a high-frequency switch circuit comprising such a branching circuit for switching signal transmission lines in high-frequency circuits in digital mobile phones (cell phones), etc., and a high-frequency switch module comprising such parts contained in or mounted onto an integral laminate and further to a wireless communications device such as a mobile phone comprising these parts.

BACKGROUND OF THE INVENTION

Wireless communications devices, for instance, mobile phones have become popular remarkably in recent years with their functions and services improved increasingly. Explanation will be made on a mobile phone as an example. There are various systems for mobile phones, for instance, GSM (Global System for Mobile Communications) and DCS1800 (Digital Cellular System 1800) systems widely used mostly in Europe, a PCS (Personal Communications Services) system used in the U.S., and a PDC (Personal Digital Cellular) system used in Japan. According to recent rapid expansion of mobile phones, however, a frequency band allocated to each system cannot allow all users to use their mobile phones in major cities in advanced countries, resulting in difficulty in connection and thus causing such a problem that mobile phones are sometimes disconnected during communication. Thus, proposal was made to permit users to utilize a plurality of systems, thereby increasing substantially usable frequency, and further to expand serviceable territories and to effectively use communications infrastructure of each system.

As a mobile phone having this new system, dual-band mobile phones (see Japanese Patent 2,983,016), triple-band mobile phones, etc. are proposed. While a usual mobile phone comprises only one transmitting/receiving system, the dual-band mobile phone comprises two transmitting/receiving systems, and the triple-band mobile phone comprises three transmitting/receiving systems. With these structures, users can choose and utilize available transmitting/receiving systems among a plurality of systems.

Such a mobile phone comprises a high-frequency switch module comprising a branching circuit (diplexer) for directing a received signal to either one of a low-frequency system and a high-frequency system depending on a frequency band of each system, and a high-frequency switch circuit for switching signal paths of a reception line and a transmission line. Usable as a means for separating reception and transmission in place of the high-frequency switch for switching lines is a branching circuit (duplexer) comprising a bandpass filter utilizing frequency difference between reception frequency and transmission frequency. For instance, Japanese Patent Laid-Open No. 8-321738 discloses a duplexer comprising a combination of a first bandpass filter and a first phase shifter with a second bandpass filter and a second phase shifter for branching signals of different frequencies, without comprising the high-frequency switch. However, Japanese Patent Laid-Open No. 8-321738 fails to refer to a combination of such duplexer with the high-frequency switch to provide a high-frequency switch circuit adapted to larger numbers of frequency bands, and the formation of these circuits to a module to provide small and lightweight wireless communications devices.

OBJECT OF THE INVENTION

Accordingly, an object of the present invention is to provide a branching circuit suitable for miniaturizing a multi-band high-frequency switch module for handling signals of a plurality of frequency bands.

Another object of the present invention is to provide a high-frequency switch circuit comprising such a branching circuit, thereby having a simple and low-cost circuit structure with small electricity consumption.

A further object of the present invention is to provide a high-frequency switch module formed by integrally laminating a plurality of dielectric green sheets having electrode patterns for the high-frequency switch circuit.

A still further object of the present invention is to provide a wireless communications device such as a small mobile phone, etc. comprising the high-frequency switch module.

DISCLOSURE OF THE INVENTION

As a result of intense research on high-frequency switch circuits for use in high-frequency circuits such as a triple-band, high-frequency switch module, etc. for handling signals in a plurality of frequency bands, the inventions have come to conceive a high-frequency switch module for triple-band mobile phones as shown in FIG. 15. This high-frequency switch module is adapted to three systems comprising a DCS1800 system (transmission TX: 1710-1785 MHz, reception RX: 1805-1880 MHz) as a first transmitting/receiving system, a PCS system (transmission TX: 1850-1910 MHz, reception RX: 1930-1990 MHz) as a second transmitting/receiving system and a GSM system (transmission TX: 880-915 MHz, reception RX: 925-960 MHz) as a third transmitting/receiving system, an antenna ANT and transmission/reception circuits of the GSM system, the DCS system and the PCS system being switched in the triple-band mobile phone.

This triple-band, high-frequency switch module comprises a branching circuit block 103 composed of a high-pass filter HPF and a low-pass filter LPF for branching a terminal connected to ANT to first and second transmitting/receiving systems (for instance, DCS and PCS) on a high-frequency side and a third transmitting/receiving system (for instance, GSM) on a low-frequency side. Disposed downstream of this branching circuit block 103 on the side of the low-pass filter is a second switch circuit block 102 for switching a line connecting a transmission circuit GSM TX of the third transmitting/receiving system GSM to the branching circuit block, and a line connecting a reception circuit GSM RX of the third transmitting/receiving system to the branching circuit block. Disposed downstream of the branching circuit block 103 on the side of the high-pass filter is a first switch circuit block 101 for switching a line for connecting a reception circuit DCS RX of the first transmitting/receiving system to the branching circuit block, a line for connecting a reception circuit PCS RX of the second transmitting/receiving systems to the branching circuit block, and a line for connecting a transmission circuit DCS/PCS TX of the first and second transmitting/receiving systems to the branching circuit block.

The first switch circuit block 101 is constituted by a high-frequency switch of an SPDT (Single Pole Dual Throw) type comprising a terminal 501, a terminal 504 connected to the transmission circuit DCS/PCS TX and a terminal 505 connected to the reception circuits DCS RX and PCS TX, and an SPDT-type high-frequency switch disposed downstream of the terminal 505 for switching an output terminal 502 connected to the first reception circuit GSM RX and an output terminal 503 connected to the second reception circuit (PCS RX). When a diode switch circuit comprising a plurality of diodes as disclosed by for instance, Japanese Patent Laid-Open No. 6-197040, etc. is used as the above switch circuit, the first switch circuit block 101 encircled by a chain line in FIG. 15 is constituted by a high-frequency switch comprising four diodes as shown in FIG. 16.

What is necessary to connect the terminal 501 to the terminal 503 in the first switch circuit block 101 is to turn diodes 201, 202 off by applying positive voltage from a voltage control circuit VC1 for switching the switch circuit, and by applying zero voltage to a voltage control circuit VC2, and to turn diodes 203, 204 on by applying positive voltage from a voltage control circuit VC4 for switching the switch circuit, and by applying zero voltage to a voltage control circuit VC3. Namely, a high-frequency signal input to the terminal 501 does not appear at the terminal 504 because the diode 202 is in an OFF state with high impedance, but appears at the terminal 505 because the diode 201 is in an OFF state with high impedance, thereby connecting the terminal 505 to the terminal 501 via a transmission line 401. Further, because the diode 203 is in an ON state with low impedance, the transmission line 403 is grounded at a high frequency, so that the transmission line 403 has high impedance viewed from the terminal 505, resulting in no high-frequency signal appearing at the terminal 502, while a high-frequency signal input to the terminal 501 appears at the terminal 503 because the diode 204 is in an ON state with low impedance.

However, when the terminal 501 is connected to the terminal 503 in the above circuit, in other words, when a mobile phone is in a state of receiving a signal, electric current of at least about 1 mA should flow between the voltage control circuits VC3-VC4, consuming a battery accordingly. Therefore, the mobile phone has a shortened reception-waiting time, having difficulty in lowering electric consumption. Also, because each of the above high-frequency switches comprises three so-called SPDT-type switches each having two output terminals per one input terminal, it has a complicated structure. Further, the high-frequency switch module needs a large circuit and thus a large laminate comprising it, disadvantageous particularly for triple band or more.

Accordingly, a high-frequency switch module further miniaturizing the mobile phone is desired. Paying attention to the impedance characteristics of bandpass filters, the inventors have found that a combination of a branching circuit comprising a phase shifter and a bandpass filter with high-frequency switch can provide a high-frequency switch circuit and its module with good insertion loss characteristics and a simple overall circuit structure as well as reduced electric consumption, thereby having completed the present invention.

Thus, the high-frequency switch circuit common to high-frequency signals of a plurality of frequency bands according to the first embodiment of the present invention comprising:

a first high-frequency switch connected to a first terminal for inputting and outputting high-frequency signals for passing a transmitting signal of a first frequency band or a transmitting signal of a second frequency band but blocking a received signal of the first frequency band and a received signal of the second frequency band; and a branching circuit comprising a first high-frequency circuit comprising a first phase shifter connected to the first terminal and a first bandpass filter disposed downstream thereof, and a second high-frequency circuit comprising a second phase shifter connected to the first terminal and a second bandpass filter disposed downstream thereof, a transmission line for constituting the first phase shifter having such a line length that the impedance of the first high-frequency circuit viewed from the input side is substantially open at a passband frequency of the second bandpass filter, a transmission line for constituting the second phase shifter having such a line length that the impedance of the second high-frequency circuit viewed from the input side is substantially open at a passband frequency of the first bandpass filter, whereby one received signal in the first and second frequency bands is permitted to pass while the other received signal is shut off.

When part of transmission/received signals of the first and second frequency bands overlap with each other, a transmitting signal of the second transmitting/receiving system (for instance, PCS) should be blocked to flow into the first high-frequency circuit on the side of a reception circuit (GSM RX) of the first transmitting/receiving system (for instance, DCS). For this purpose, it is effective that the second high-frequency switch for passing a received signal of the first frequency band or a received signal of the second frequency band but blocking a transmitting signal of the first frequency band and a transmitting signal of the second frequency band is disposed between the first terminal and the branching circuit.

The high-frequency switch circuit common to high-frequency signals of a plurality of frequency bands according to the second embodiment of the present invention comprising:

first and second filter circuits connected to an antenna terminal and having different passbands from each other;

a first high-frequency switch connected to the second filter circuit for passing a transmitting signal of the first frequency band or a transmitting signal of the second frequency band but blocking a received signal of the first frequency band and a received signal of the second frequency band;

a second high-frequency switch connected to the second filter circuit for passing a received signal of the first frequency band or a received signal of the second frequency band but blocking a transmitting signal of the first frequency band and a transmitting signal of the second frequency band;

a branching circuit connected to the second high-frequency switch for passing one received signal in the first and second frequency bands but blocking the other received signal, comprising a first high-frequency circuit comprising a first phase shifter connected to a terminal on the side of the second high-frequency switch and a first bandpass filter disposed downstream thereof, and a second high-frequency circuit comprising a second phase shifter connected to the terminal and a second bandpass filter disposed downstream thereof; and a high-frequency switch circuit connected to the first filter circuit for switching a transmitting signal and a received signal of the third transmitting/receiving system.

The high-frequency switch circuit common to high-frequency signals of a plurality of frequency bands according to the third embodiment of the present invention comprising:

first and second filter circuits connected to an antenna terminal and having different passbands from each other;

a first high-frequency switch connected to the second filter circuit for switching a signal path for passing a transmitting signal of the first frequency band and a transmitting signal of the second frequency band, and a signal path for passing a received signal of the first frequency band and a received signal of the second frequency band;

a branching circuit connected to the first high-frequency switch for passing one received signal of the first or second frequency band but blocking the other received signal, comprising a first high-frequency circuit comprising a first phase shifter connected to a terminal on the side of the first high-frequency switch and a first bandpass filter disposed downstream thereof, and a second high-frequency circuit comprising a second phase shifter connected to the terminal and a second bandpass filter disposed downstream thereof; and a high-frequency switch circuit connected to the first filter circuit for switching a transmitting signal and a received signal of the third transmitting/receiving system.

The high-frequency switch circuit common to high-frequency signals of a plurality of frequency bands according to the fourth embodiment of the present invention comprising:

first and second filter circuits connected to an antenna terminal and having different passbands from each other;

a first high-frequency switch connected to the second filter circuit for passing a transmitting signal of the first frequency band or a transmitting signal of the second frequency band but blocking a received signal of the first frequency band and a received signal of the second frequency band;

a second high-frequency switch connected to the second filter circuit for passing a received signal of the first frequency band or a received signal of the second frequency band but blocking a transmitting signal of the first frequency band and a transmitting signal of the second frequency band;

a branching circuit connected to the second high-frequency switch for passing one received signal of the first or second frequency band but blocking the other received signal, comprising a first high-frequency circuit comprising a first phase shifter connected to a terminal on the side of the second high-frequency switch and a first bandpass filter disposed downstream thereof, and a second high-frequency circuit comprising a second phase shifter connected to the terminal and a second bandpass filter disposed downstream thereof;

a third high-frequency switch connected to the first filter circuit for passing a transmitting signal of the third frequency band or a transmitting signal of the fourth frequency band but blocking a received signal of the third frequency band and a received signal of the fourth frequency band;

a fourth high-frequency switch connected to the first filter circuit for passing a received signal of the third frequency band or a received signal of the fourth frequency band but blocking a transmitting signal of the third frequency band and a transmitting signal of the fourth frequency band; and a branching circuit connected to the fourth high-frequency switch for passing one received signal of the third or fourth frequency band but blocking the other received signal, comprising a first high-frequency circuit comprising a first phase shifter connected to a terminal on the side of the fourth high-frequency switch and a first bandpass filter disposed downstream thereof, and a second high-frequency circuit comprising a second phase shifter connected to the terminal and a second bandpass filter disposed downstream thereof.

The high-frequency switch circuit common to high-frequency signals of a plurality of frequency bands according to the fifth embodiment of the present invention comprising:

first and second filter circuits connected to an antenna terminal and having different passbands from each other;

a first high-frequency switch connected to the second filter circuit for switching a signal path for passing a transmitting signal of the first frequency band and a transmitting signal of the second frequency band, and a signal path for passing a received signal of the first frequency band and a received signal of the second frequency band;

a branching circuit connected to the first high-frequency switch for passing one received signal of the first or second frequency band but blocking the other received signal, comprising a first high-frequency circuit comprising a first phase shifter connected to a terminal on the side of the first high-frequency switch and a first bandpass filter disposed downstream thereof, and a second high-frequency circuit comprising a second phase shifter connected to the terminal and a second bandpass filter disposed downstream thereof;

a second high-frequency switch connected to the first filter circuit for switching a signal path for passing a transmitting signal of the third frequency band and a transmitting signal of the fourth frequency band, and a signal path for passing a received signal of the third frequency band and a received signal of the fourth frequency band; and a branching circuit connected to the second high-frequency switch for passing one received signal of the third or fourth frequency band but blocking the other received signal, comprising a first high-frequency circuit comprising a first phase shifter connected to a terminal on the side of the second high-frequency switch and a first bandpass filter disposed downstream thereof, and a second high-frequency circuit comprising a second phase shifter connected to the terminal and a second bandpass filter disposed downstream thereof.

The above are the structures of high-frequency switch circuits for dual band, triple band and quarto band in this order. In triple-band or quatro-band, high-frequency switches, it is preferable that the former is constituted by an SPST-type, high-frequency switch, while the latter is constituted by an SPDT-type, high-frequency switch.

In the branching circuit of the present invention, because a phase shift angle of a phase circuit in one high-frequency circuit is properly adjusted such that the input impedance in a passband of a filter in the other high-frequency circuit becomes high, there is substantially no leak in both frequency components corresponding to the respective passband filters. Therefore, output can be withdrawn only by transmission loss of the filter, resulting in low insertion loss. Incidentally, the phase circuit, which may also be called phase shift circuit, functions to adjust the phase shift angle to turn the input impedance substantially open. Because this branching circuit is used in place of the high-frequency switch, the number of diodes decreases, resulting in low electricity consumption. In addition, the SPST-type high-frequency switch makes the circuit structure simpler, and even in the case of using an SPDT-type, one high-frequency switch can be omitted as compared with the circuit shown in FIG. 15, thereby providing less expensive, high-frequency switch modules. This is more effective as the number of frequency bands handled increases from a dual band to a triple band and to quarto band.

One feature of the present invention is that a transmission circuit is shared by the first, second, third and fourth transmitting/receiving systems, resulting in simple and small overall structure of the high-frequency switch circuit. Also, the first and second phase shifters may be constituted by transmission lines and capacitors, and the transmission lines preferably have a line length of λ/10-λ/4. The line length is an actual length of a line in a spiral or meander form, etc.

The first and second bandpass filters are surface acoustic filters, laminate-type dielectric filters, coaxial resonator filters and bulk-wave filters, and preferable among them is the surface acoustic filter (including a balanced output-type surface acoustic filter and an unbalanced output-type surface acoustic filter).

In the present invention, it is preferable that the transmission lines or the capacitors for the phase shifters are constituted by electrode patterns formed on a plurality of green sheets made of dielectric materials, and that these green sheets are laminated and sintered to an integral laminate, thereby forming a branching circuit having a one-chip structure. Also, the bandpass filters (for instance, surface-mounted surface acoustic filters) are preferably mounted onto a top surface of the integral laminate.

In the high-frequency switch circuit for each band, an unbalanced output-type surface acoustic filter preferably constitutes the bandpass filter for the branching circuit, with a balun connected to the output of this surface acoustic filter. With a balun circuit for unbalance-balance conversion connected to the output of a surface acoustic filter of an unbalanced input-unbalanced output type, there is no need to provide an additional conversion circuit when circuits and electronic parts downstream of the unbalanced output-type surface acoustic filter are of a balanced input type. Particularly when the balun circuit is contained in the integral laminate, the number of parts and the area for mounting parts can be reduced. Of course, when a surface acoustic filter of an unbalanced input-balanced output type is used, such means is unnecessary. Preferable switch elements for these high-frequency switch circuits are diodes and transistors, and the diode switch is most effective.

The branching circuit module for handling a plurality of transmitting/receiving systems of different passbands according to the present invention comprises a first phase shifter connected to a first terminal for inputting and outputting high-frequency signals, a first bandpass filter disposed downstream thereof, a second phase shifter connected to the first terminal, and a second bandpass filter disposed downstream thereof, the first phase shifter and the second phase shifter being contained in a sintered laminate of dielectric green sheets, and the first passband filter and the second passband filter being mounted onto the laminate.

In the above branching circuit module, the first phase shifter is constituted by a transmission line having such a line length that the impedance viewed from the input side is substantially open at a passband frequency of the second bandpass filter, and the second phase shifter is constituted by a transmission line having such a line length that the impedance viewed from the input side is substantially open at a passband frequency of the first bandpass filter.

In the high-frequency switch module for handling a plurality of transmitting/receiving systems of different passbands according to the present invention, the phase shifters of the above high-frequency switch circuit, the bandpass filters and the first and second filter circuits are constituted by transmission lines and capacitors.

In the above high-frequency switch module, at least part of transmission lines and capacitors in the phase shifter, the bandpass filter and the first and second filter circuits and at least part of transmission lines in the first to fourth high-frequency switches are constituted by electrode patterns formed on a plurality of green sheets made of a dielectric material, the green sheets being laminated and sintered to an integral laminate containing the electrode patterns, with diodes constituting the high-frequency switch mounted onto the integral laminate.

With phase shifters constituted by transmission lines, elements including bandpass filters can be constituted by electrode patterns contained in an integral laminate, thereby forming a high-frequency switch module of a one-chip structure, which is small and lightweight with high freedom of design as high-frequency parts. The electrode patterns of the transmission lines for the phase shifters are preferably formed on lower layers than those constituting the bandpass filters. With the electrode patterns of the transmission lines for the phase shifters arranged lower than those of the bandpass filters, insertion loss characteristics and isolation characteristics can be improved.

The wireless communications device of the present invention comprises the above high-frequency switch module. The wireless communications device is preferably a mobile phone.

In the preferred embodiment of the present invention, the mobile phone comprises the above high-frequency switch circuit, and a voltage control circuit for applying voltage for determining the operation mode of the high-frequency switch circuit.

Because the mobile phone of the present invention comprises a small, lightweight, high-frequency switch module of a low electricity consumption type having good insertion loss characteristics, it has high reception sensitivity and long reception-waiting time.

BEST MODE FOR CARRYING OUT THE INVENTION

The embodiments of the present invention are explained in detail below referring to the attached figures. For simplicity of explanation, a DCS (transmission TX: 1710-1785 MHz, reception RX: 1805-1880 MHz) system as the first signal frequency band f1, a PCS (transmission TX: 1850-1910 MHz, reception RX: 1930-1990 MHz) system as the second signal frequency band f2, a GSM (transmission TX: 880-915 MHz, reception RX: 925-960 MHz) system as the third signal frequency band f3, and a DAMPS (Digital Advanced Mobile Phone Service, transmission TX: 824-849 MHz, reception RX: 869-894 MHz) system as the fourth signal frequency band f4 are taken as examples, though the present invention, of course, is applicable to other communications systems.

[1] Branching Circuit

Figure 1:
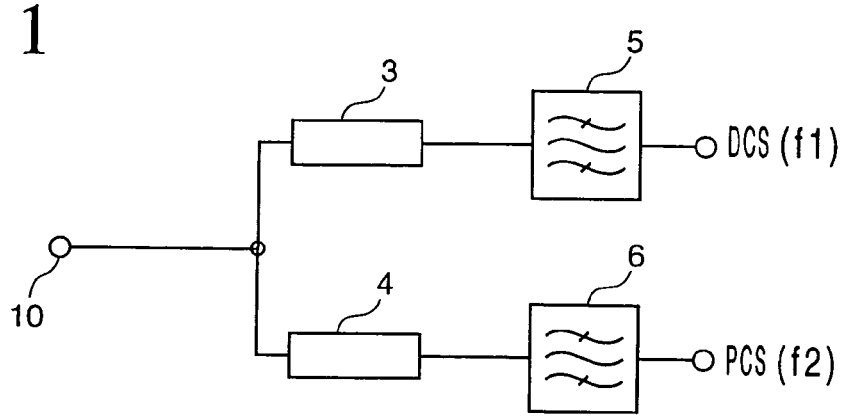
FIG. 1 is a block diagram showing the branching circuit of the present invention.

FIG. 1 is a block diagram showing one example of the branching circuit of the present invention. This branching circuit is a dual-band branching circuit for branching the received signals of DCS (f1) and PCS (f2), which comprises (a) a first high-frequency circuit of a DCS system comprising a first phase shifter 3 connected to a common terminal 10 and a first bandpass filter 5 disposed downstream thereof, and (b) a second high-frequency circuit of a PCS system comprising a second phase shifter 4 similarly connected to the terminal 10 and a second bandpass filter 6 disposed downstream thereof.

Figure 4:
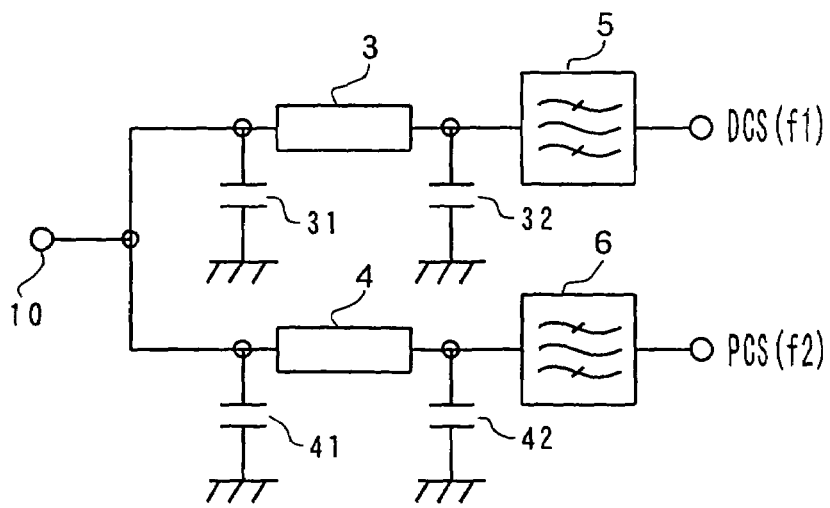
FIG. 4 is a block diagram showing another example of the branching circuit of the present invention.

FIG. 4 is a block diagram showing another example of the branching circuit of the present invention. This branching circuit comprises capacitors 31, 32 connected upstream and downstream of the first phase shifter 3 and capacitors 41, 42 connected upstream and downstream of the second phase shifter 4. The branching circuit in this embodiment is advantageous in that the transmission line can be made short.

Figure 2:
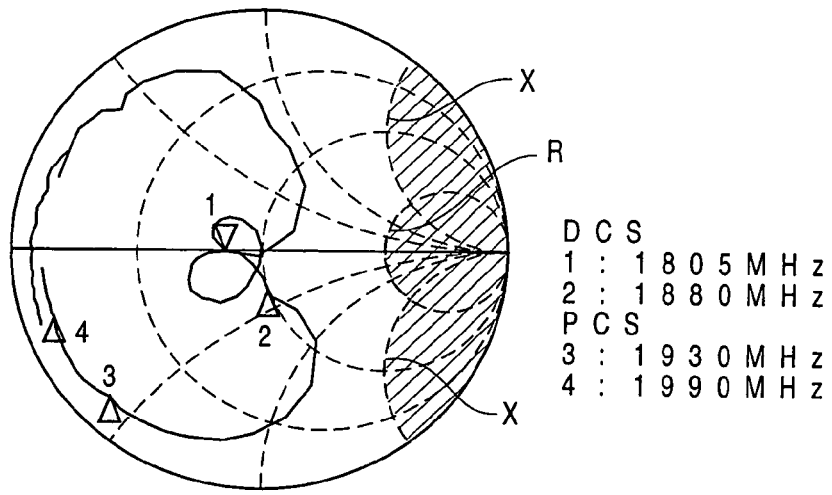
FIG. 2 is a Smith chart showing the impedance characteristics of a bandpass filter.
Figure 3:
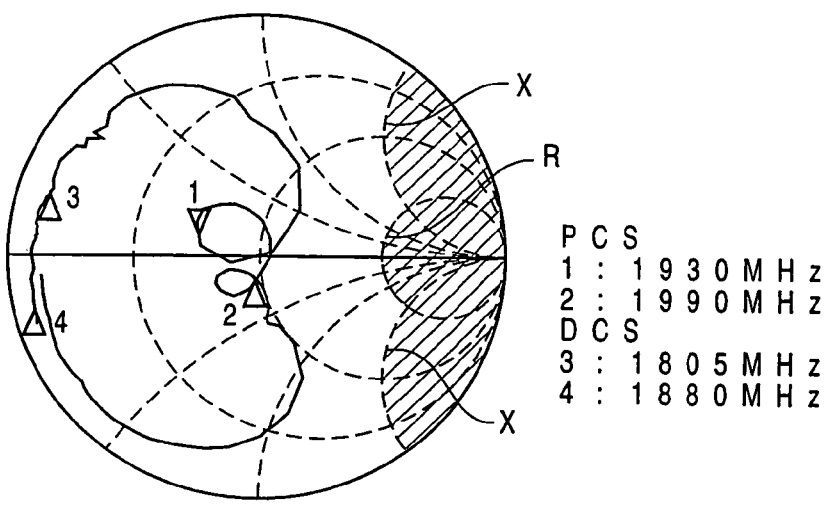
FIG. 3 is a Smith chart showing the impedance characteristics of a bandpass filter.

Each of the phase shifters 3 and 4 is constituted by a transmission line having an actual line length of about λ/10-λ/4 at a frequency band f1, f2. As shown in the Smith chart of FIG. 2, the first bandpass filter 5 comprises a surface acoustic filter (SAW) having input impedance of substantially 50Ω in a reception frequency band of DCS system, resulting in substantially a short-circuited state in a reception frequency band of the PCS system. As shown in the Smith chart of FIG. 3, the second bandpass filter 6 comprises a surface acoustic filter (SAW) having input impedance of substantially 50Ω in a reception frequency band of the PCS system, resulting in substantially a short-circuited state in a reception frequency band of the DCS system.

As described above, the first bandpass filter 5 has attenuation characteristics necessary for a system in which the reception band of DCS is a passband f1, the impedance characteristics of the first bandpass filter 5 viewed from the input side being such that it is substantially in a short-circuited state in a reception passband f2 of PCS. On the other hand, the second bandpass filter 6 has such impedance characteristics as to exhibit attenuation characteristics necessary for a system in which the reception band of PCS is a passband f2, the impedance viewed from the side of the second bandpass filter 6 being substantially in a short-circuited state in a reception passband of DCS.

This branching circuit is constituted such that it meets the following conditions: With a phase shifter 3 disposed upstream of the first bandpass filter 5, the impedance characteristics of the first high-frequency circuit viewed form the side of the terminal 10 are in a substantially open state in a reception band f2 of PCS. Also, with the phase shifter 4 disposed upstream of the second bandpass filter 6, the impedance characteristics of the second high-frequency circuit viewed form the side of the terminal 10 are in a substantially open state in a reception band f1 of DCS. Accordingly, without the second phase shifter 4, a signal of the reception band f1 of DCS sent to the first reception circuit would be absorbed by the second bandpass filter 6, because the input impedance of the second bandpass filter 6 in a reception band f1 of DCS is substantially in a short-circuited state. However, with the second phase shifter 4, the impedance of the second high-frequency circuit in a reception band f1 of DCS viewed form the side of the terminal 10 is phase-reversed to a substantially open state, a high-frequency signal flows into the first reception circuit via the first high-frequency circuit.

The same is true when a signal of reception band f2 of PCS is sent to the second reception circuit. With the first phase shifter 3, the impedance of the first high-frequency circuit in a reception band f2 of PCS viewed form the side of terminal 10 is phase-reversed to a substantially open state, causing a high-frequency signal to flow into the second reception circuit via the second high-frequency circuit.

The term "substantially open state" means a case where the real number part R is adjusted to 150Ω or more, and a case where an absolute value of the imaginary number part X is adjusted to 100Ω or more, in the impedance Z expressed by $Z=R+jX$. Expressed in Smith charts of FIGS. 2 and 3, for instance, this "substantially open state" corresponds to hatched regions on the right side. Accordingly, when a signal of the reception band f1 of DCS is sent to the first reception circuit, the line length of the second transmission line 4 should be adjusted, such that the impedance of the second high-frequency circuit in the reception band f1 of DCS viewed form the side of the terminal 10 is included in a hatched region on the Smith chart of FIG. 3. Also, when a signal of the reception band f2 of PCS is sent to the second reception circuit, the line length of the first transmission line 3 should be adjusted, such that the impedance of the first high-frequency circuit in the reception band f2 of PCS viewed form the side of the terminal 10 is included in a hatched region on the Smith chart of FIG. 2.

[2] High-frequency Switch Circuit

Figure 5:
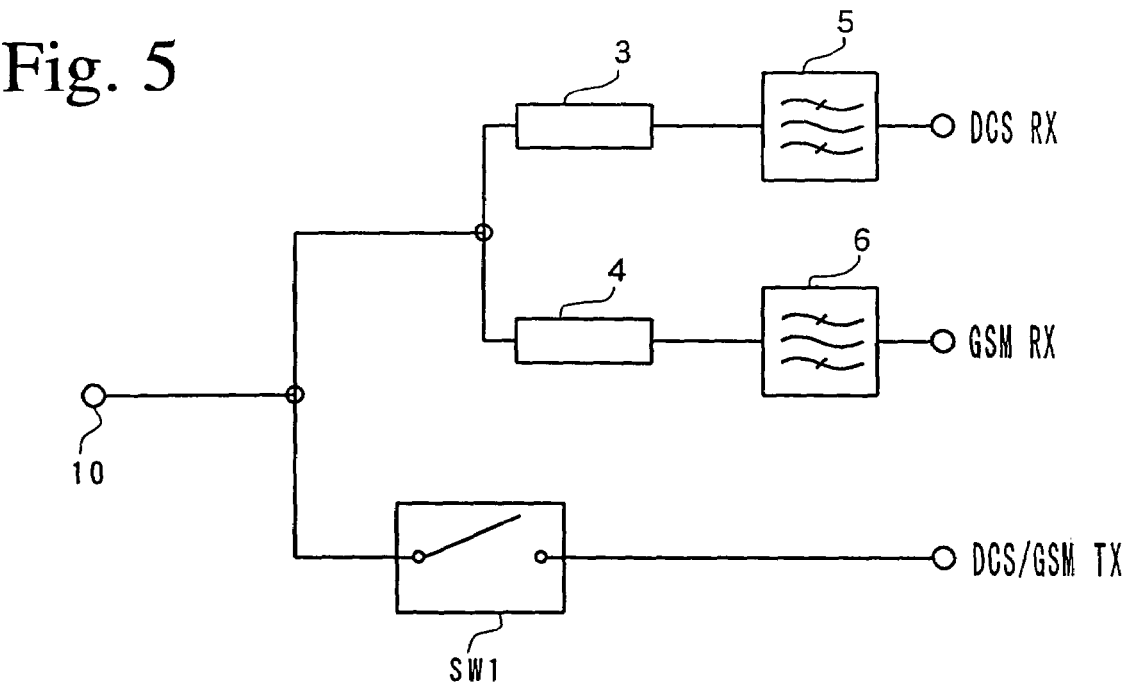
FIG. 5 is a block diagram showing one example of the dual-band, high-frequency switch circuit of the present invention.

FIG. 5 is a block diagram showing a dual-band, high-frequency switch circuit common to both systems of DCS and GSM according to the first embodiment of the present invention. This high-frequency switch circuit comprises a branching circuit as a means for branching the received signals of DCS and GSM, a circuit common to a transmitting system of a DCS system and a transmitting system of a GSM system, and a common terminal. A first high-frequency switch SW1 disposed in a signal path is a switch of an SPST (Single Pole Single Throw) type for preventing the received signals of DCS and GSM from entering into the transmission circuit.

Figure 6:
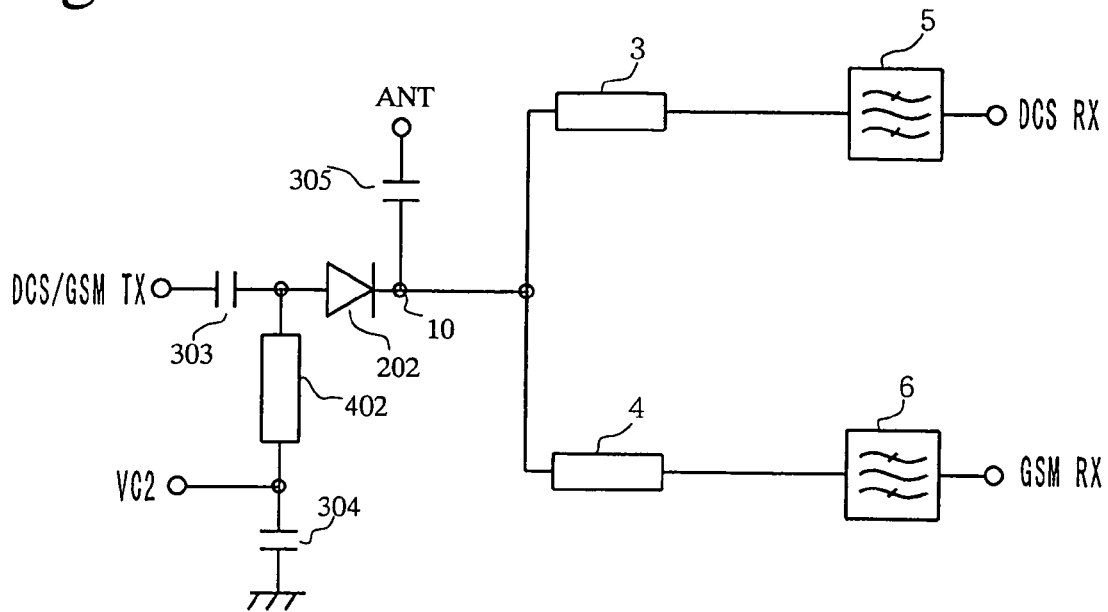
FIG. 6 is a view showing an equivalent circuit of the dual-band, high-frequency switch circuit of FIG. 5.

FIG. 6 is an equivalent circuit of the dual-band, high-frequency switch circuit SW1 in the embodiment shown in FIG. 5. A common terminal 10 is connected to an antenna ANT to switch a transmission TX of DCS/GSM and a reception RX of DCS or GSM to the antenna ANT. The first switch circuit SW1 comprises as main elements a diode 202 and a transmission line 402, and the diode 202 has a cathode connected to an input/output terminal 10 and an anode connected to a transmitting system TX for both DCS and GSM via a capacitor 303, and connected to a transmission line 402 connected to a ground via a capacitor 304. Also, a voltage control circuit VC2 for controlling the diode is connected between the transmission line 402 and the capacitor 304.

The branching circuit shown in FIG. 1 is inserted between the common terminal 10 and each receiving system RX for DCS and GSM, and this branching circuit passes one of received signals of DCS and GSM without regard to voltage control of the diode while blocking the other received signal, so that it is operated without leak of both received signals. Accordingly, there is no need of a switch circuit comprising a diode, resulting in a simple circuit structure.

Figure 7:
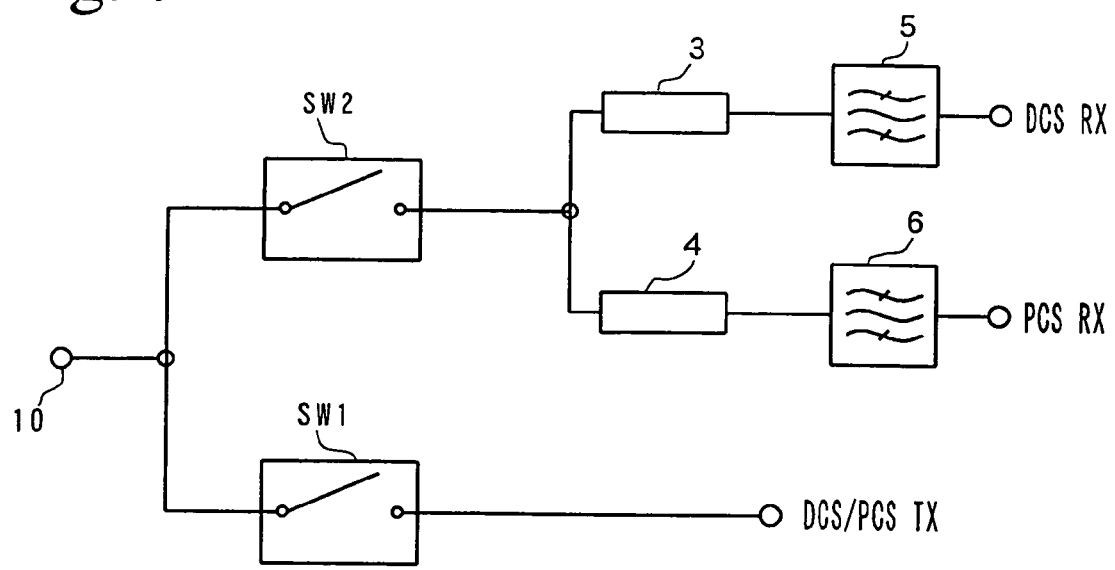
FIG. 7 is a block diagram showing another example of the dual-band, high-frequency switch circuit of the present invention.

FIG. 7 shows a high-frequency switch circuit according to the second embodiment of the present invention. In this circuit, a high-frequency switch SW2 is disposed upstream of the phase shifters 3, 4 shown in FIG. 5. Such structure can be used even when a reception band of DCS and a transmission band of PCS partially overlap with each other as in a combination of DCS and PCS. In this embodiment, the high-frequency switches SW1, SW2 are of an SPST type, though they may be SPDT-type, high-frequency switches as shown in FIG. 8.

Figure 8:
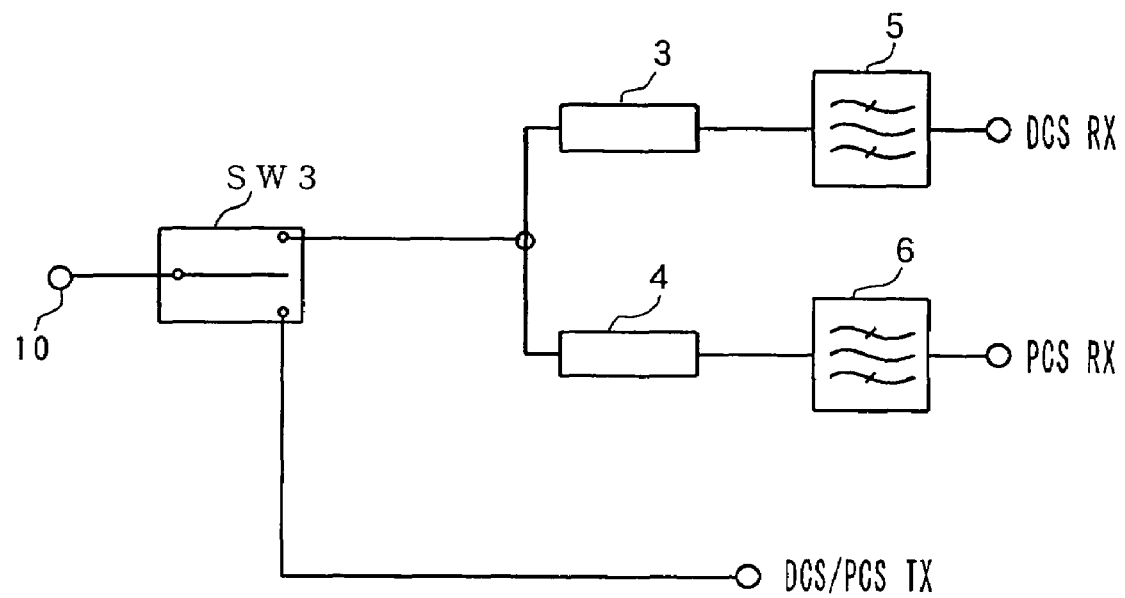
FIG. 8 is a block diagram showing a further example of dual-band, high-frequency switch circuit of the present invention.
Figure 9:
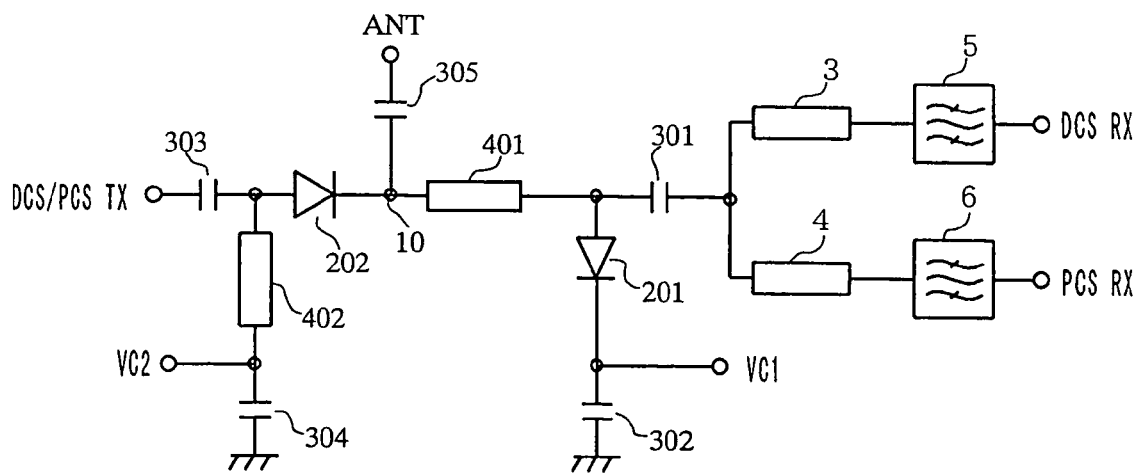
FIG. 9 is a view showing an equivalent circuit of the dual-band, high-frequency switch circuit of FIG. 8.

FIG. 9 shows an equivalent circuit of high-frequency switch circuit of FIG. 8, in which a high-frequency switch 1 and a high-frequency switch 2 are constituted by diode switches. What differs from the circuit of FIG. 6 are that a transmission line 401 is connected between a common terminal 10 on the antenna side and a branching circuit on the side of reception, that a diode 201 is connected such that its anode is connected to the reception side, that a capacitor 302 is connected between the cathode of the diode 201 and a ground, and that a voltage control circuit VC1 for diode control is connected between the diode 201 and the capacitor 302. Inserted between the anode of the diode 201 and each reception RX of DCS and PCS is a branching circuit shown in FIG. 1. Because a diode is omitted in a switch circuit for switching DCS RX and PCS RX in this embodiment, too, the high-frequency switch circuit has a simple structure.

Figure 10:
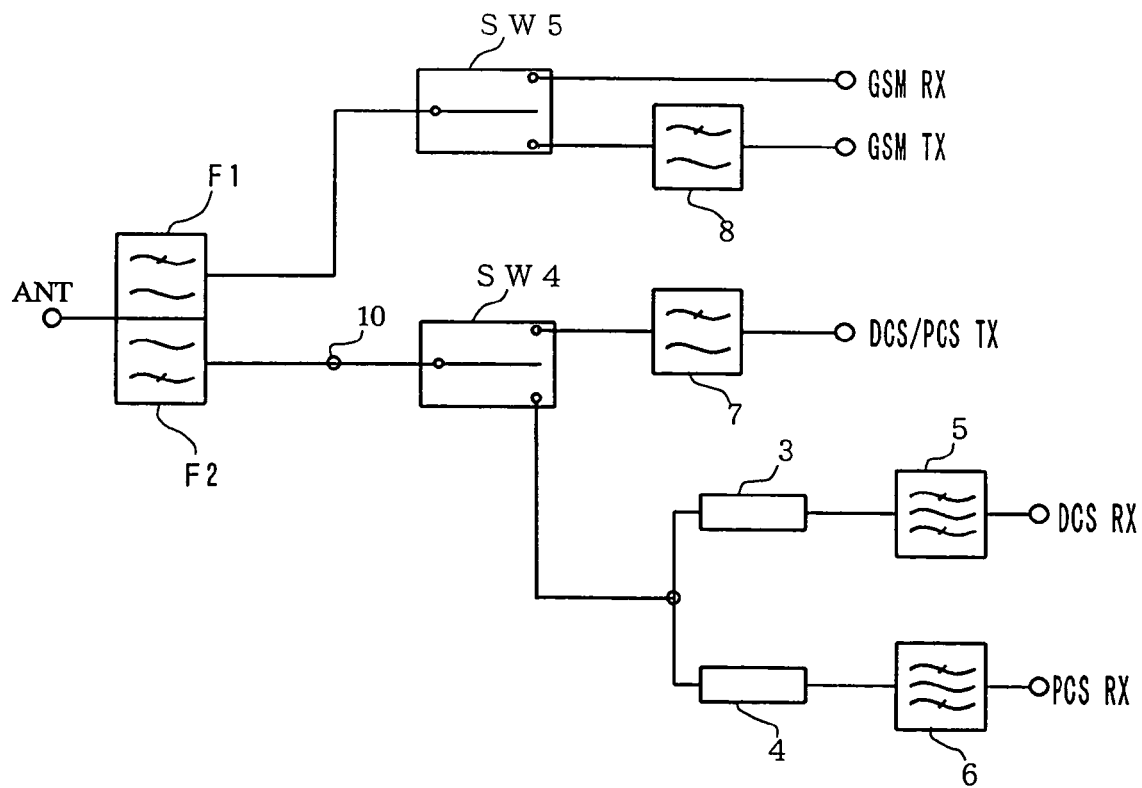
FIG. 10 is a block diagram showing one example of the triple-band, high-frequency switch circuit of the present invention.

FIG. 10 shows a high-frequency switch circuit according to the third embodiment of the present invention. This circuit is a triple-band, high-frequency switch circuit common to three systems of DCS, PCS and GSM. In this high-frequency switch circuit, too, the same branching-circuit as above is used as a means for branching the received signals of DCS and PCS. Connected to an antenna ANT are first and second filter circuits F1, F2. The first filter circuit F1 is a low-pass filter LPF, to which a high-frequency switch SW5 for switching a reception circuit RX and a transmission circuit TX of GSM is connected. The second filter circuit F2 is a high-pass filter HPF, to which the above high-frequency switch circuit for DCS and PCS is connected. Incidentally, a low-pass filter 7 is connected between the SPDT-type, high-frequency switch SW4 and the transmission TX of DCS/PCS, and a low-pass filter 8 for sending a transmitting signal is connected between the high-frequency switch SW5 and the transmitting system TX of GSM.

Figure 12:
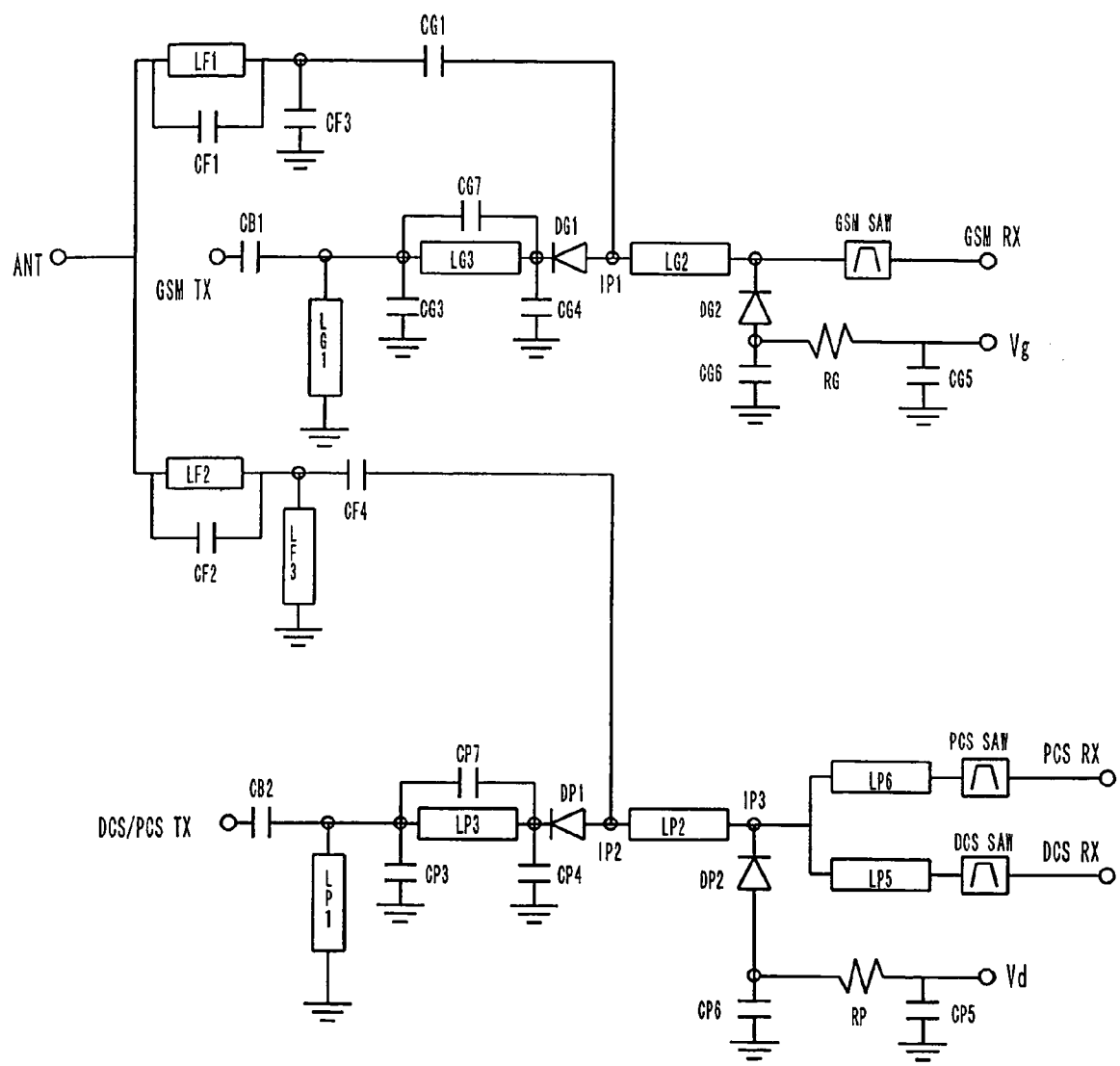
FIG. 12 is a view showing an equivalent circuit of one example of the triple-band, high-frequency switch circuit of the present invention.

FIG. 12 shows one example of an equivalent circuit of the triple-band, high-frequency switch module explained in detail below.

Figure 11:
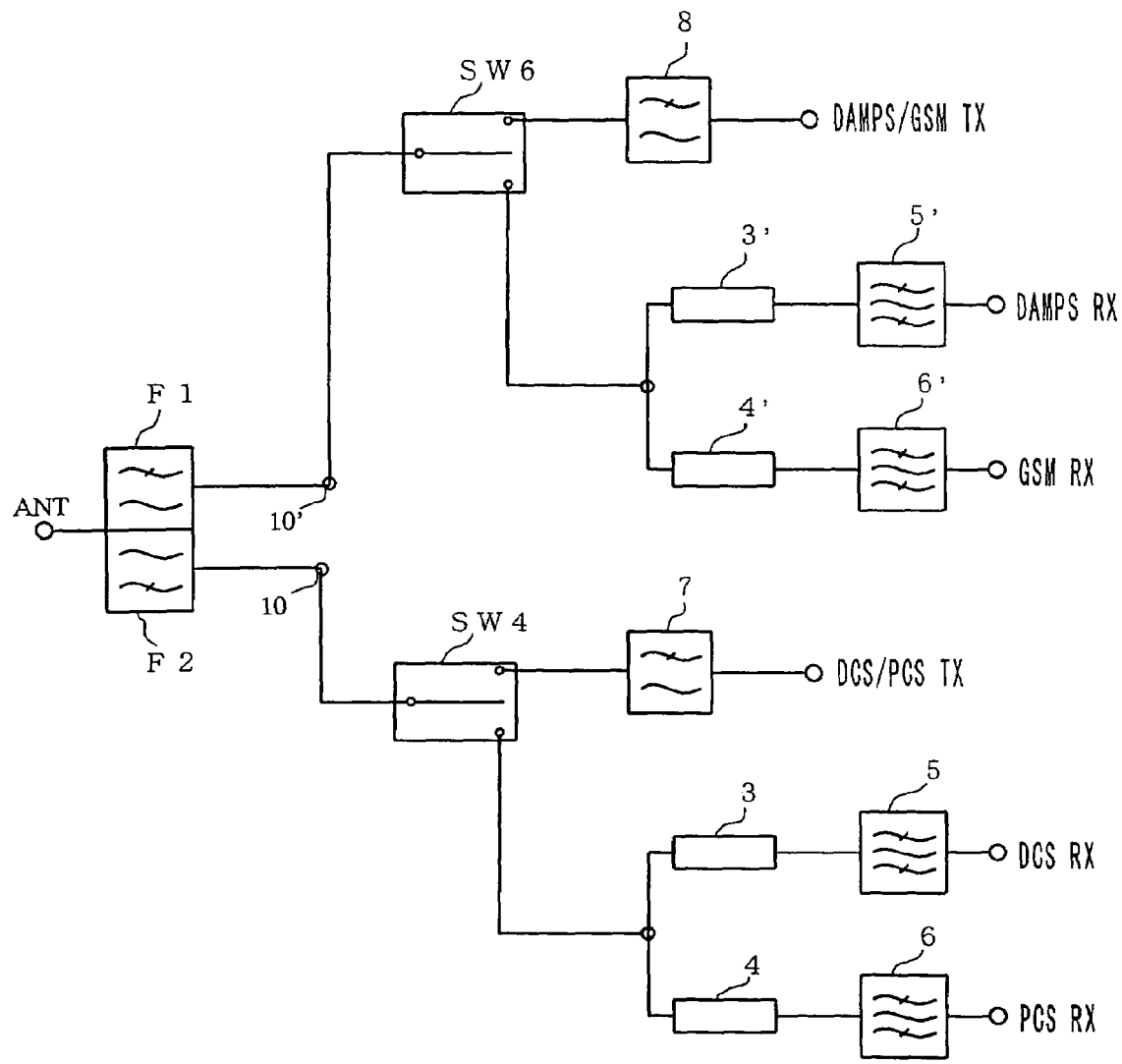
FIG. 11 is a block diagram showing one example of the quatro-band high-frequency switch circuit of the present invention.

FIG. 11 shows a high-frequency switch circuit according to the fourth embodiment of the present invention. This high-frequency switch circuit is a quatro-band, high-frequency switch circuit common to four systems of DCS, PCS, GSM and DAMPS. This high-frequency switch circuit, too, comprises branching circuits as means for branching the received signals of DCS and PCS and the received signals of GSM and DAMPS, respectively. Also, it comprises a transmission circuit common to GSM and DAMPS, additionally with a low-pass filter 8 and a high-frequency switch SW6. Because the other structures are the same as in the triple-band, high-frequency switch circuit shown in FIG. 10, their explanations will be omitted.

In the high-frequency switch circuit in the above each embodiment, a balun circuit (BAL), which is an unbalance-balance conversion circuit, may be connected downstream of the surface acoustic wave (SAW) filter. Because the surface acoustic filter is of an unbalanced input-unbalanced output type, the connection of the balun circuit in the high-frequency switch circuit makes additional conversion circuits unnecessary, as long as circuits or electronic parts downstream of the surface acoustic filter are of a balanced-input type. Particularly when the balun circuit is contained in an integral laminate, the number of parts and the area for mounting parts can be reduced.

An equivalent circuit of the triple-band, high-frequency switch circuit shown in FIG. 10 will be explained in detail referring to FIG. 12. Each of the first and second filter circuits F1, F2 connected to the antenna ANT is constituted by a transmission line and a capacitor. The equivalent circuit shown in FIG. 12 comprises a low-pass filter as a first filter F1 for passing the transmission/received signals of GSM while attenuating the transmission/received signals of DCS and PCS, and a high-pass filter as a second filter F2 for passing transmission/received signals of DCS and PCS while attenuating the transmission/received signals of GSM. The first filter F1 has a structure in which a transmission line LF1 and a capacitor CF1 are connected in parallel, with a capacitor CF3 connected between them and a ground. The second filter F2 has a structure in which a transmission line LF2 and a capacitor CF2 are connected in parallel with a transmission line LF3 connected between them and a ground, and a capacitor CF4 is connected to the transmission line LF2 and the capacitor CF2 in series. With such structure, the received signals of the first transmitting/receiving system and the second and third transmitting/receiving system can be separated. The first and second filters F1, F2 may have other structures a-h:

a. A structure in which the first filter circuit is constituted by a low-pass filter, and the second filter circuit is constituted by a notch filter;
b. A structure in which the first filter circuit is constituted by a notch filter, and the second filter circuit is constituted by a bandpass filter;
c. A structure in which the first filter circuit is constituted by a low-pass filter, and the second filter circuit is constituted by a bandpass filter;
d. A structure in which the first filter circuit is constituted by a notch filter, and the second filter circuit is constituted by a notch filter;
e. A structure in which the first filter circuit is constituted by a notch filter, and the second filter circuit is constituted by a high-pass filter;
f. A structure in which the first filter circuit is constituted by a bandpass filter, and the second filter circuit is constituted by a bandpass filter;
g. A structure in which the first filter circuit is constituted by a bandpass filter, and the second filter circuit is constituted by a notch filter; and
h. A structure in which the first filter circuit is constituted by a bandpass filter, and the second filter circuit is constituted by a high-pass filter.

A third high-frequency switch circuit SW5 for switching a transmission circuit TX and a reception circuit RX of GSM, a high-frequency switch circuit SW4 for switching a transmission circuit TX of DCS/PCS, a reception circuit DCS RX of DCS and a reception circuit PCS RX of PCS, and a branching circuit for passing one received signal but blocking the other received signal to switch a reception circuit DCS RX of DCS and a reception circuit PCS RX of PCS, all connected downstream of the first and second filters F1, F2, comprise transmission lines as main constituents.

The third high-frequency switch circuit SW5 is an upper switch circuit in FIG. 12, which switches a transmission circuit TX and a reception circuit RX of GSM. The switch circuit SW5 comprises two diodes DG1, DG2 and two transmission lines LG1, LG2 as main constituents, and the diode DG1 is disposed between an input/output terminal IP1 of a transmission/received signal of GSM and GSM TX, such that the anode of the diode DG1 is connected to the input/output terminal IP1, with the transmission line LG1 connected between the cathode of the diode DG1 and the ground. The transmission line LG2 is connected between the input/output terminal IP1 and GSM RX, and the end of the transmission line LG2 on the side of GSM RX is connected to a cathode of the diode DG2. A capacitor CG6 is connected between the anode of diode DG2 and the ground. A voltage control circuit Vg is connected between the anode of the diode DG2 and the capacitor CG6 via a resistor RG and a capacitor CG5 having one end ground.

Each of the transmission line LG1 and the transmission line LG2 has such a line length that its resonance frequency is within a frequency band region of the transmitting signal of GSM. Particularly when their resonance frequencies are substantially equal to an intermediate frequency (897.5 MHz) of a transmitting signal frequency of GSM, excellent insertion loss characteristics can be achieved within a desired frequency band region. The low-pass filter circuit inserted between the first filter F1 and GSM TX is constituted by a transmission line and capacitors. In the equivalent circuit shown in FIG. 12, a π-type, low-pass filter constituted by a transmission line LG3 and capacitors CG3, CG4, CG7 is inserted between the diode DG1 and the transmission line LG1.

The high-frequency switch circuit SW4 is a lower switch circuit in FIG. 12 for switching a reception circuit DCS RX of DCS, a reception circuit PCS RX of PCS and a transmission circuit DCS/PCS TX of DCS and PCS. This switch circuit comprises two diodes DP1, DP2, the above branching circuit, and two transmission lines LP1, LP2 as main constituents. The diode DP1 is disposed between the input/output terminal IP2 of the transmission/received signal of DCS/PCS and DCS/PCS TX, with its anode connected to the input/output terminal IP2 and with the transmission line LP1 connected between its cathode and a ground. A transmission line LP2 is connected between the input/output terminal IP2 and the branching circuit, and a diode DP2 having a cathode connected to the transmission line LP2 is disposed between one end of the transmission line LP2 on the side of the branching circuit and the ground. A capacitor CP6 is connected between the anode of the diode DP2 and the ground. A voltage control circuit Vd is connected between the anode of the diode DP2 and the capacitor CP6 via a resistor RP and a capacitor CP5 having one end grounded. A first high-frequency circuit on the side of DCS RX comprising the transmission line LP5 and the bandpass filter DCS SAW connected to the transmission line LP5, and a second high-frequency circuit on the side of PCS RX comprising the transmission line LP6 and the bandpass filter PCS SAW connected to the transmission line LP6 are connected to the cathode of DP2 in parallel, constituting a branching circuit.

The transmission lines LP1 and LP2 have such a line length as to provide resonance frequency within a frequency band region (1710 MHz-1910 MHz) between a lower-limit frequency and an upper-limit frequency of the transmitting signals of DCS and PCS. More preferably, the resonance frequency of the transmission lines LP1 and LP2 is substantially an intermediate frequency (1810 MHz) of the transmitting signal frequencies of DCS and PCS, to obtain excellent electric characteristics in each mode, so that two transmitting signals can be treated by one circuit.

With such a structure, the circuit can be made simpler with fewer circuit parts to provide a miniaturized high-frequency switch module with excellent electric characteristics, as compared with a case where the transmitting systems of DCS and PCS are handled separately. Also, some parts such as amplifiers can be made common to the transmission circuits of the first and second transmitting/receiving systems, thereby further making mobile phones comprising high-frequency switch modules smaller and lighter in weight.

A low-pass filter circuit inserted between the second filter F2 and DCS/PCS TX is constituted by a transmission line and a capacitor. In the equivalent circuit shown in FIG. 12, a π-type, low-pass filter circuit constituted by the transmission line LP3 and the capacitors CP3, CP4 and CP7 is inserted between the diode DP1 and the transmission line LP1. In this low-pass filter circuit, its transmission line LP3 has a line length corresponding to an intermediate frequency of the transmitting signals of the transmitting/receiving systems of DCS and PCS, specifically $\lambda/8$-$\lambda/12$. Here, assuming that the first transmitting/receiving system is DCS, and the second transmitting/receiving system is PCS, for instance, the "intermediate frequency" of the transmitting signal is a middle of the transmitting signal of DCS (1710-1785 MHz) and the transmitting signal of PCS (1850-1910 MHz), namely 1810 MHz. If the line length of the transmission line LP3 is $\lambda/8$ or more relative to this intermediate frequency, passband characteristics are narrow band, failing to obtain desired insertion loss characteristics near the lower-limit frequency of the transmitting signal of DCS and near the transmitting signal of PCS. Also, if it is less than $\lambda/12$, there is less attenuation in high-frequency regions such as a second harmonic wave, a third harmonic wave, etc. In any case, the characteristics of a high-frequency switch module are undesirably deteriorated.

The high-frequency switch circuit of the present invention selects any one of the first, second and third transmitting/receiving systems, by supplying voltage from the voltage control circuit to control ON/OFF of the diode switches. The operation of the high-frequency switch circuit having the equivalent circuit shown in FIG. 12 will be explained in detail below.

(1) DCS/PCS TX Mode

To connect the first and second transmission circuits DCS/PCS TX to the second filter F2, positive voltage is supplied from the voltage control circuit Vd. The positive voltage supplied from the voltage control circuit Vd is removed of a DC component by capacitors CB2, CP3, CP4, CP5, CP6, CF4 and bandpass filters of DCS SAW and PCS SAW, and applied to the circuit including the diodes DP1, DP2, so that the diodes DP1, DP2 are turned on. With the diode DP1 in an ON state, impedance is low between the first and second transmission circuits DCS/PCS TX and the connection point IP2. Also, the diode DP2 in an ON state and the capacitor CP6 has the transmission line LP2 grounded at a high frequency to cause resonance, thereby making the impedance of the first and second reception circuits DCS RX and PCS RX viewed from the side of the connection point IP2 extremely large. Accordingly, the transmitting signal from the first and second transmission circuit DCS/PCS TX is transmitted to the second filter without leak to the first reception circuit DCS RX and the second reception circuit PCS RX.

(2) GSM RX Mode

To connect the first reception circuit DCS RX to the second filter F2, zero voltage is applied from the voltage control circuit Vd to turn the diodes DP1, DP2 off. With the diode DP1 in an OFF state, impedance between the connection point IP2 and the first and second transmission circuit DCS/PCS TX is large. Thus, the diode DP2 in an OFF state has the connection point IP2 connected to the connection point IP3 via the transmission line LP2. Also, the second high-frequency circuit comprising a combination of the transmission line LP6 and the bandpass filter PCS SAW is adjusted to have such impedance is substantially open in a reception band f1 of the first frequency band DCS viewed from IP3 to the side of the second reception circuit PCS RX. Accordingly, a received signal from the second filter F2 in a reception band f1 of the first frequency band DCS is transmitted to the first reception circuit DCS RX without leaking to the first and second transmission circuits DCS/PCS TX and the second reception circuit PCS RX.

(3) PCS RX Mode

Because it is the same as the GSM RX mode, explanation is omitted.

(4) GSM TX Mode

To connect the third transmission circuit GSM TX to the first filter F1, positive voltage is applied from the voltage control circuit Vg. With a DC component removed from the positive voltage applied from the voltage control circuit Vg by capacitors CB1, CG6, CG5, CG4, CG3 and CG1 and the bandpass filter of GSM SAW, the positive voltage is applied to a circuit including diodes DG2, DG1 to turn the diodes DG2, DG1 on. With the diode DG1 in an ON state, impedance between the third transmission circuit GSM TX and the connection point IP1 is low. Also, the diode DG2 turned on and the capacitor CG6 have the transmission line LG2 grounded at a high frequency to cause resonance, resulting in extremely increased impedance viewed from the connection point IP1 to the third reception circuit GSM RX. Accordingly, the transmitting signal from the third transmission circuit GSM TX is transmitted to the first filter without leaking to the third reception circuit GSM RX.

(5) GSM RX Mode

To connect the third reception circuit GSM RX to the first filter F1, zero voltage is applied to the voltage control circuit Vg, to turn the diodes DG1, DG2 off. With the diode DG2 in an OFF state, the connection point IP1 is connected to the third reception circuit GSM RX via the transmission line LG2. Also, with the diode DG1 in an OFF state, impedance between the connection point IP1 and the third transmission circuit GSM TX is large. Accordingly, a received signal from the first filter F1 is sent to the third reception circuit GSM RX without leaking to the third transmission circuit GSM TX1.

[3] High-frequency Switch Module

Another feature of the present invention is that at least part of transmission lines and capacitors constituting the phase shifters, the bandpass filters, the first and second filter circuits, the low-pass filters, etc., and at least part of transmission lines constituting the high-frequency switches in each of the above embodiments are formed by electrode patterns on a plurality of green sheets made of a dielectric material, and that green sheets with electrode patterns are laminated and sintered to an integral laminate, so that these elements are contained in the laminate, while the diodes for constituting the high-frequency switches are mounted onto the integral laminate, thereby providing a small high-frequency switch module.

Figure 13:
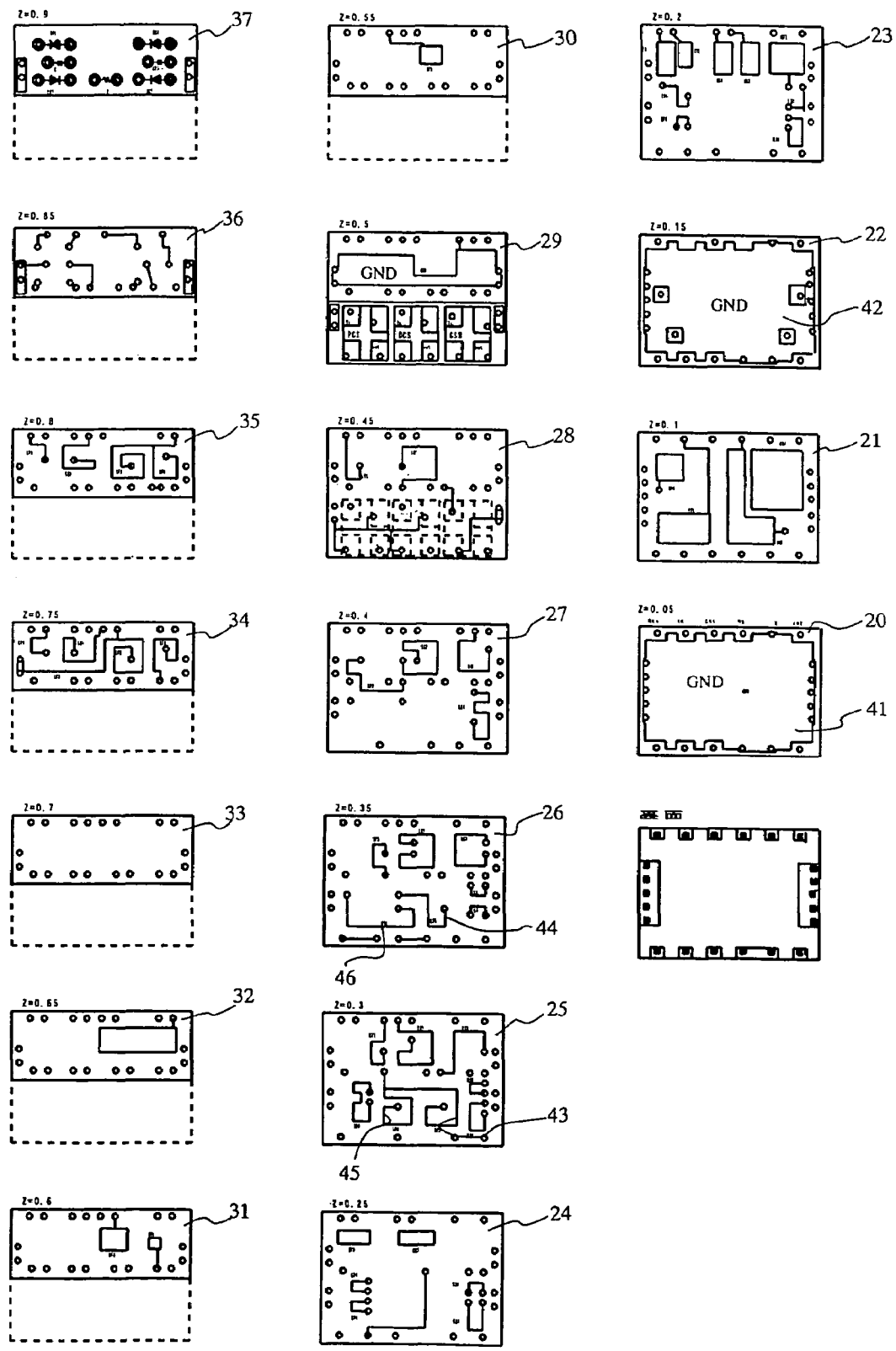
FIG. 13 is a development showing green sheets having electrode patterns constituting the integral laminate of the present invention.
Figure 14:
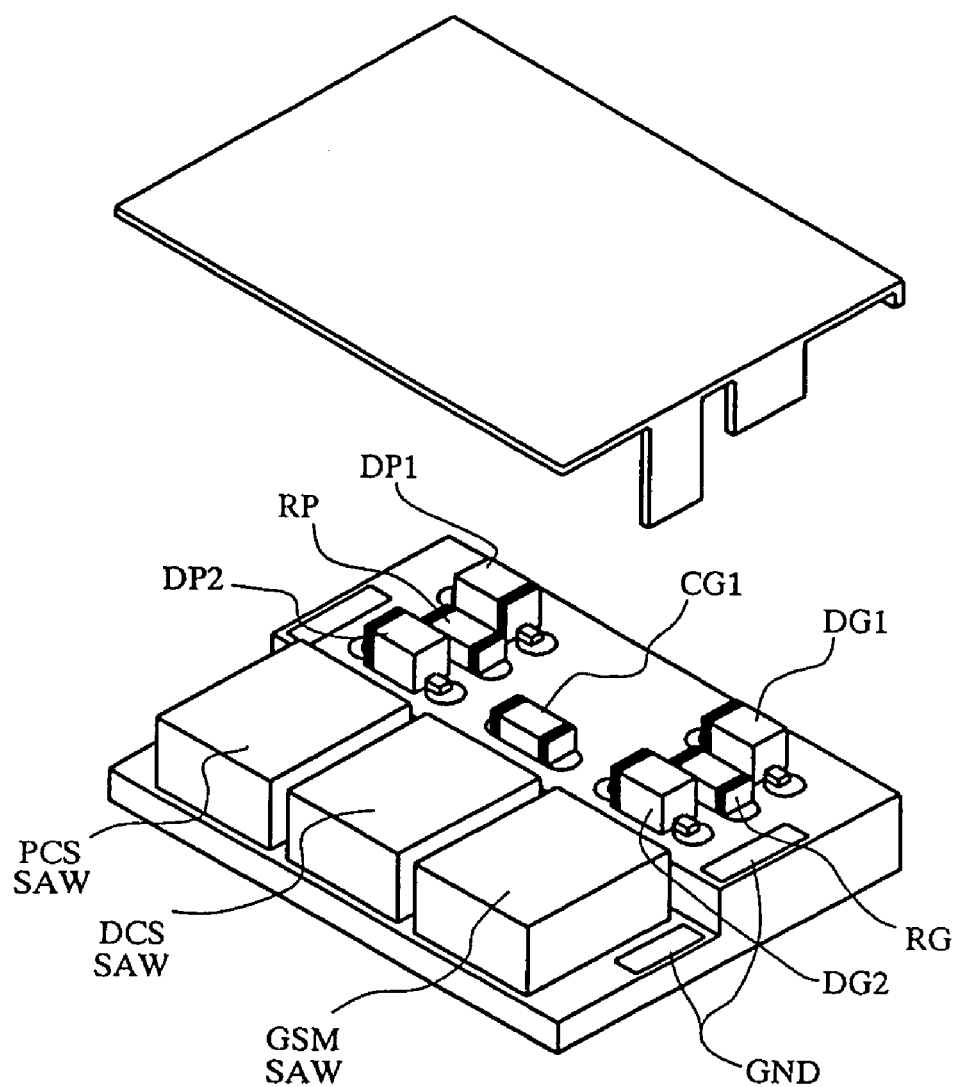
FIG. 14 is a perspective view showing the appearance of an integral laminate containing a triple-band, high-frequency switch circuit.
Figure 15:
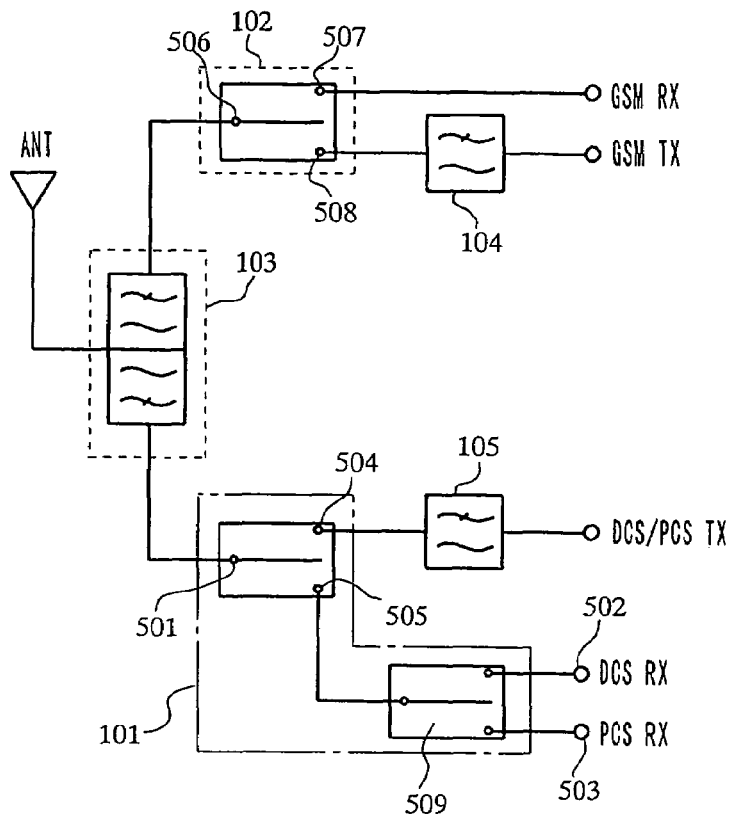
FIG. 15 is a block diagram showing one example of the triple-band, high-frequency switch module.
Figure 16:
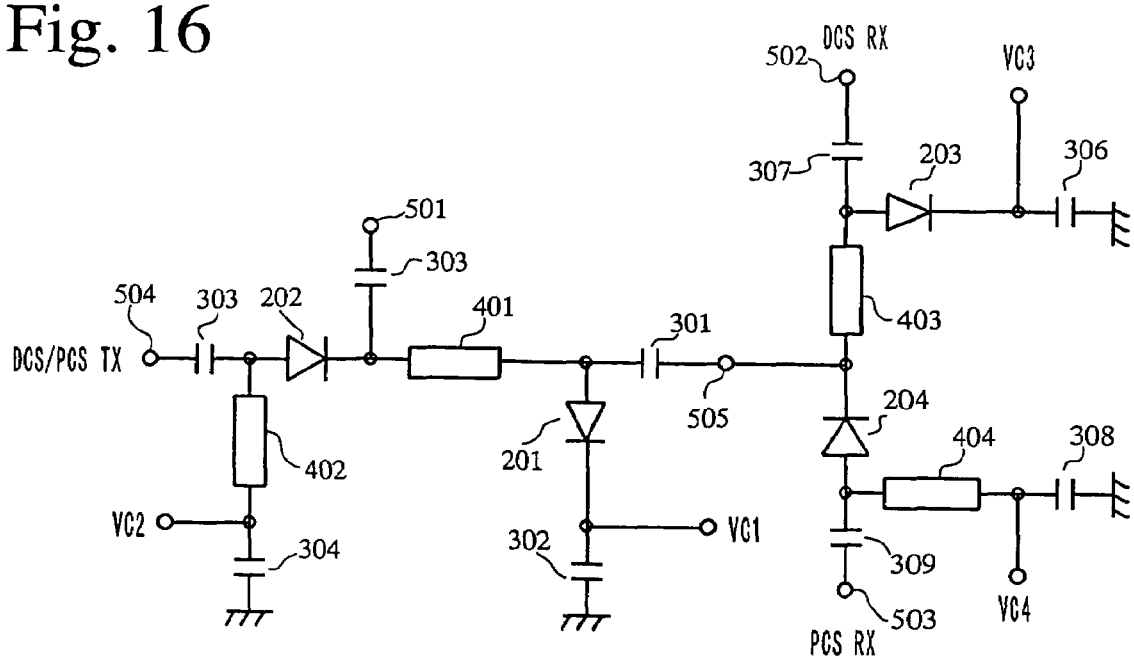
FIG. 16 is a view showing an equivalent circuit of the triple-band, high-frequency switch module of FIG. 15.

The appearance of the laminate according to one embodiment of the present invention is shown in a perspective view of FIG. 14, and the inner structure of the laminate is shown in FIG. 13. In this embodiment, the transmission lines of the first and second filter circuits, the low-pass filter circuit and the switch circuits are formed in the laminate, while diodes, bandpass filters and high-capacitance capacitors that cannot be contained as chip capacitors in the laminate are mounted onto the laminate; thereby providing a one-chip-type, triple-band, high-frequency switch module.

The laminate of the high-frequency switch module is produced by preparing green sheets of 50 μm-200 μm in thickness made of dielectric ceramic materials that can be sintered at low temperatures, printing a conductive paste based on Ag on each green sheet to form a desired electrode pattern, properly laminating the electrode pattern-formed green sheets, and integrally sintering the laminated green sheets. Each line electrode is mostly formed with a width of 100-400 μm.

The inner structure of the high-frequency switch module will be explained in the order of lamination. First, a ground electrode 41 is formed on a substantially entire surface of a lowermost green sheet 20. Through-holes for connecting to terminal electrodes formed on a rear surface are formed in peripheral portions on four sides of the green sheet 20. Next, four capacitors (constituting a capacitance with a ground) connected between the voltage control circuits Vg, Vd and the diodes DG2, DP2 are printed in electrode patterns on the green sheet 21, which is then laminated. Laminated thereon is a green sheet 22 having a ground electrode 42 formed on a substantially entire surface, and then a green sheet 23 formed with five capacitor electrodes and four line electrodes for constituting a low-pass filter, etc. Further laminated thereon is a green sheet 24 having two capacitor electrodes and five line electrodes formed thereon. Further laminated is a green sheet 25 formed with eight line electrodes, two of which constitute transmission lines LP5 and LP6, a green sheet 26 having seven line electrodes, two of which constitute transmission lines LP5 and LP6, and then a green sheet 27 having four line electrodes formed thereon and a green sheet 28 having two line electrodes formed thereon.

These line electrodes are properly connected via through-holes to form transmission lines for the first, second and third switch circuits SW1, SW2, SW5, transmission lines for the phase shifters 3, 4, and transmission lines for the first and second filter circuits and the low-pass filters. The line electrodes 43 and 44 are connected to each other via through-hole electrodes to form the transmission line LP5 in the equivalent circuit, and the line electrodes 45 and 46 are connected to each other via through-hole electrodes to form the transmission line LP6 in the equivalent circuit. The other line electrodes are connected via through-hole electrodes to form transmission lines LG2, LP2, LG3, LP3 in the equivalent circuit.

The laminate is provided with steps for mounting SAW filters as bandpass filters in a green sheet 29 laminated on the green sheet 28 and its overlying green sheets, and three SAW filters for DCS, PCS and GSM are mounted thereon. Also, a half of this green sheet 29 is provided with a ground electrode. Green sheets 30, 31, 32 laminated thereon are formed with proper electrodes for capacitors. A green sheet 33 laminated thereon has only a through-hole. Line electrodes for constituting transmission lines LF1, LF2 constituting the first and second filter circuits F1, F2, and line electrodes for constituting LP1, LG1 are formed between a green sheet 34 laminated on the green sheet 33 and a green sheet 35. A green sheet 36 laminated thereon and an uppermost green sheet 37 are formed with lands for connecting elements mounted thereon, and diodes DG1, DG2, DP1, DP2, a capacitor CG1 and resistors RG, RP are mounted onto the lands.

These green sheets were compressed and integrally sintered to form a laminate of 6.7 mm×5.0 mm×1.0 mm in outer dimension. Mounted on this laminate were diodes DG1, DG2, DP1, DP2, a chip capacitor CF3, chip resistors RP, RG and bandpass filters GSM SAW, DCS SAW, PCS SAW. FIG. 13 shows a state where these elements are mounted onto the laminate.

The control logic of each voltage control circuit Vg, Vd in the high-frequency switch module of this embodiment is shown in Table 1. With this control logic, each mode of GSM, DCS and PCS is changed.

TABLE 1

| Mode | Vg | Vd |
|---|---|---|
| GSM TX | High | Low |
| DCS TX | Low | High |
| PCS TX | Low | High |
| GSM RX | Low | Low |
| GSM RX | Low | Low |
| PCS RX | Low | Low |

Using this high-frequency module for a multiband mobile phone, it has been found that it enjoyed low electricity consumption in a battery, providing a low-electricity consumption mobile phone.

Though the systems of DCS, PCS and GSM are used in the above explanation, the same effects can be obtained in a combination of other systems (for instance, GPS, D-AMPS, TD-SCDMA), too.

According to the present invention, the high-frequency switch circuit having a simple circuit structure with low electricity consumption, the small, lightweight, inexpensive, high-frequency switch module capable of handling signals of a plurality of frequency bands, and the wireless communications device such as a mobile phone comprising such high-frequency switch module can be obtained.

What is claimed is:

1. A high-frequency switch module comprising a high-frequency switch circuit common to high-frequency signals of a plurality of frequency bands comprising said high-frequency switch circuit, comprising:

first and second filter circuits connected to an antenna terminal and having different passbands from each other;

a first high-frequency switch connected to said second filter circuit for switching a signal path for passing a transmitting signal of a first frequency band and a transmitting signal of a second frequency band, and a signal path for passing a received signal of said first frequency band and a received signal of said second frequency band; and a branching circuit connected to said first high-frequency switch for passing one received signal in said first and second frequency bands but blocking the other received signal, wherein said high-frequency switch circuit is formed in a laminate having terminal electrodes formed on one surface thereof.

2. A high-frequency switch module comprising a high-frequency switch circuit common to high-frequency signals of a plurality of frequency bands comprising said high-frequency switch circuit, comprising:

first and second filter circuits connected to an antenna terminal and having different passbands from each other;

a first high-frequency switch for switching a signal path for passing a transmitting signal of a first frequency band and a transmitting signal of a second frequency band, and a signal path for passing a received signal of said first frequency band and a received signal of said second frequency band;

a branching circuit connected to said first high-frequency switch for passing one received signal in said first and second frequency bands but blocking the other received signal;

a second high-frequency switch connected to said first filter circuit for switching a signal path for passing a transmitting signal of a third frequency band and a transmitting signal of a fourth frequency band, and a signal path for passing a received signal of said third frequency band and a received signal of said fourth frequency band; and a branching circuit connected to said second high-frequency switch for passing one received signal of said third or fourth frequency band but blocking the other received signal, wherein said high-frequency switch circuit is formed in a laminate having terminal electrodes formed on one surface thereof.

3. The high-frequency switch module according to claim 1 or 2, wherein a ground electrode is formed on a substantially entire surface of at least one green sheet being laminated and sintered to said laminate.

4. The high-frequency switch module according to claim 3, wherein through-holes are formed in a peripheral portion of said ground electrode, which are connected to at least part of said terminal electrodes.

5. The high-frequency switch module according to claim 4, wherein the other through-holes are formed in a peripheral portion of said green sheet being laminated and sintered for connecting them to the remaining terminal electrodes.

6. The high-frequency switch module according to claim 1 or 2, wherein said first and second filter circuits comprise transmission lines and capacitors, said first high-frequency switch comprises a switching element, and said branching circuit comprises a phase shifter and a bandpass filter.

7. The high-frequency switch module according to claim 6, wherein said bandpass filter is either a balanced output-type surface acoustic filter or an unbalanced output-type surface acoustic filter.

8. The high-frequency switch module according to claim 7, wherein at least part of transmission lines and capacitors in said phase shifter, said bandpass filter and said first and second filter circuits are constituted by electrode patterns formed on a plurality of green sheets made of a dielectric material, said green sheets being laminated and sintered to an integral laminate containing said electrode patterns, with switching elements constituting said high-frequency switches mounted onto said laminate.

9. A wireless communications device comprising the high-frequency switch module according to claim 1 or 2.

10. A mobile phone comprising the high-frequency switch module according to claim 1 or 2.

\* \* \* \* \*